July 19, 1938. T. A. PETERMAN 2,124,469
WHEEL CONSTRUCTION
Filed April 6, 1937
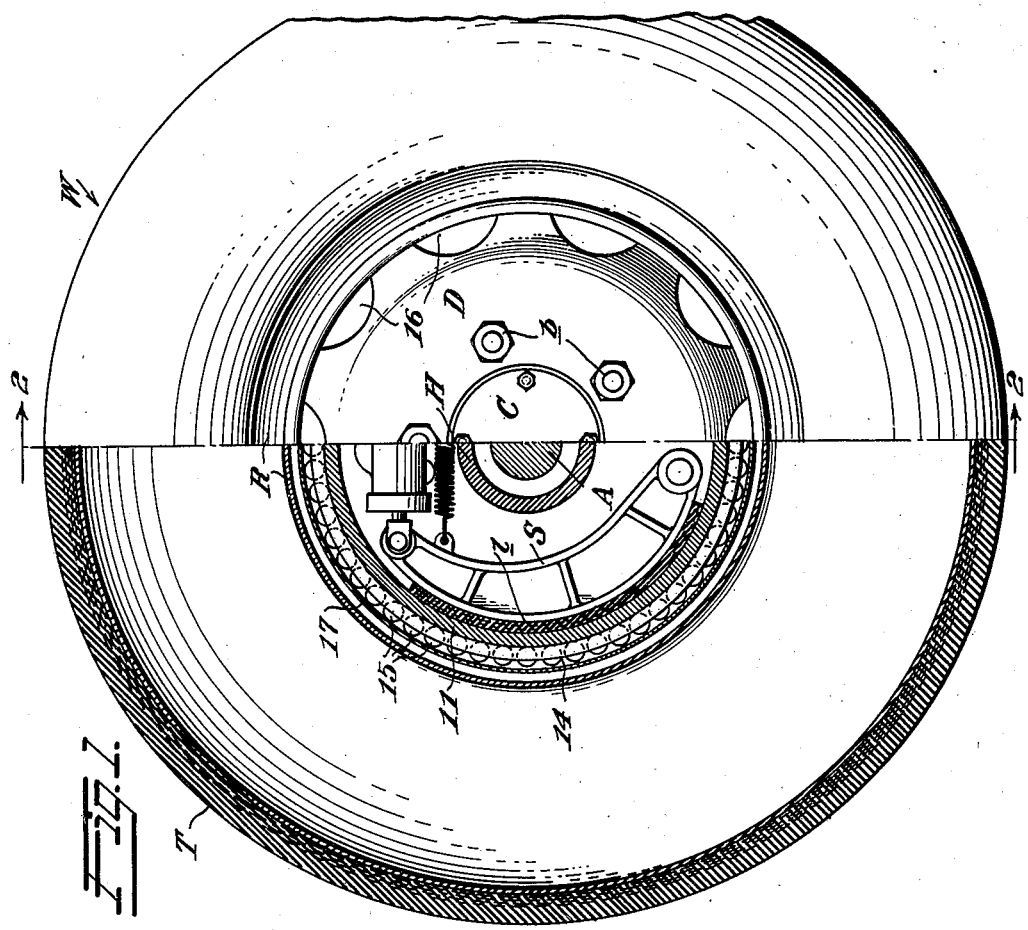
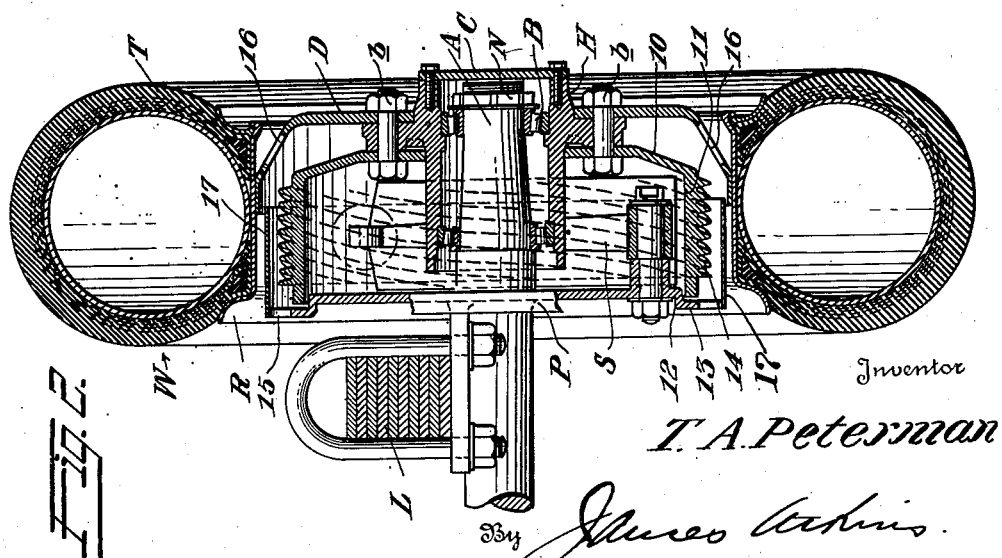
Inventor
T. A. Peterman
By James Atkins
Attorney Patented July 19, 1938

2,124,469

UNITED STATES PATENT OFFICE 2,124,469

WHEEL CONSTRUCTION

Theodore A. Peterman, Tacoma, Wash.

Application April 6, 1937, Serial No. 135,322

3 Claims. (Cl. 301—6)

The present invention relates to improvements in wheel constructions.

More specifically, the invention relates to automotive wheels having cushion tires and brake assemblies, wherein novel means are provided for cooling the braking surfaces and also protecting the tires against detrimental action of the heat generated by friction between the braking surfaces.

In wheel constructions, especially as applied to heavy duty vehicles such as trucks, trailers, and the like, a large amount of heat is generated by friction between the braking surfaces upon applying the brakes due to the great amount of energy to be absorbed when heavy and high speed vehicles are brought to rest.

The heat generated by the braking mechanism is not only highly detrimental to the brake shoe linings, but such heat also has a detrimental action on the tires, especially where large diameter brake drums are utilized as in heavy duty vehicle wheels, and wherein the braking surfaces are closely adjacent the wheel rims on which the tires are directly supported.

While it is appreciated that efforts have heretofore been made to dissipate the heat generated by the braking mechanism in wheel constructions, nevertheless the means proposed have either been of a highly complicated nature or have failed to dissipate the heat with sufficient rapidity to avoid injury to the brake shoes or tires.

A primary object of the present invention is the provision of a wheel construction having a cushion tire and brake assembly and novel means for dissipating the heat generated by the brake assembly operative upon rotation of the wheel construction.

A further object of the invention is the provision of a wheel construction having a rim and a cushion tire supported thereon, a brake drum within the rim and having co-acting internal brake shoes, and means carried by the outer cylindrical surface of the drum for effecting a flow of air between the rim and drum and transverse thereto upon rotation of the wheel construction for dissipating the heat generated by friction between the drum and brake shoes.

A still further object of the invention is the provision of a wheel construction having a cushion tire and a brake drum within the same, and wherein the drum is provided externally thereof with a spiral rib whereby upon rotation of the drum, a current of air will be induced between the tire and drum and transverse thereto, for dissipating the heat from the brake drum, and wherein a baffle plate is disposed between the tire and drum for protecting the tire against action of the heat being dissipated.

A final object of the invention is the provision of a wheel construction having novel means for dissipating heat generated by the brake assembly which are simple in construction, reliable in operation, and which can be constructed at relatively low cost.

With the above objects in view, as well as others that will present themselves in the course of the following disclosure, reference will now be made to the accompanying drawing forming part of same, and wherein:—

Figure 1 is a view partially in side elevation and partially in vertical longitudinal section of a wheel constructed in accordance with a preferred embodiment of my invention.

Fig. 2 is a vertical transverse section substantially on line 2—2, Fig. 1.

Referring to the drawing by reference characters, and wherein like characters designate like parts, W indicates the wheel in its entirety, and while the essential wheel elements may be of various forms, nevertheless the wheel illustrated as an example for disclosing an operative embodiment of the invention comprises a hub H rotatably journalled on an axle A by means of suitable roller bearing assemblies B, the outer one of which is maintained on the axle by means of a nut N, and which is housed within the hub by means of a hub cap C suitably secured to the outer end of the hub as by means of bolts, as illustrated.

Secured to the hub H as by bolts $b$ is a disk D, to the outer horizontal margin of which is suitably secured a tire rim R detachably supporting a pneumatic tire T in well known manner.

Yieldably supported by a leaf spring assembly L is a backing plate P which is fixed relatively to the axle A and whose outer edge is disposed inwardly of the rim R.

Pivotally supported by the backing plate P are brake shoes S each having a lining $l$ for frictional braking engagement with the inner cylindrical surface of the brake drum 10, later referred to. The brake shoes S may be hydraulically operated as illustrated, or they may be operated pneumatically or mechanically.

The wheel construction as above described and as illustrated on the drawing forms no essential part of the present invention except for the modification of certain elements thereof as will later be described, and accordingly the essential wheel elements may be of various forms so far as the present invention is concerned. Thus, the rim R may be supported from the hub by means other than a disk and the hub H may be fixed to a driven axle, as the present invention is applicable to both driven wheels as well as wheels rotatably journalled on a fixed axle, as illustrated.

In accordance with the present invention, the brake drum 10 which is preferably secured to the hub H by the bolts b has the free edge of its cylindrical portion 11 disposed in slightly spaced relation to a shoulder 12 on the plate P and terminates in slightly spaced relation to the axially inwardly off-set marginal portion 13 of the plate P as is clearly illustrated in Fig. 2.

The cylindrical portion 11 is provided externally thereof with a spiral rib or fin 14, the portion 13 of plate P is provided with a series of circumferential air holes 15 whose centers are preferably transversely alined with the outer edge of the rib, and the disk D is provided with air holes 16. While the rim R is disclosed as being supported by a disk D having air holes 16, nevertheless other rim-supporting means may be provided, it being essential only in so far as the present invention is concerned that openings of some form be provided in the rim-supporting means.

Suitably supported at its axially inner edge upon the outer edge of the plate portion 13 is an air guide shell or baffle 17 which in conjunction with the brake drum provides an air current chamber into which the rib 14 projects and with the air holes 15 and 16 disposed at the respective opposite sides of the chamber.

Furthermore, the baffle 17 is disposed in substantial spaced relation to the rim R thereby preventing the heat generated by the brake assembly from injuriously affecting the tire T.

It is to be noted that the spacing of the baffle 17 from the rim R not only shields the tire T from the action of the heat generated by the brake but also provides an air space between the rim R and baffle 17 which is completely open at one side of the rim R and the relatively large holes 16 are so disposed that both the air current chamber above referred to and the air space between the rim and baffle are in communication with the atmosphere.

While the shell 17 does not in the present embodiment of the invention extend the full width of the brake drum, nevertheless it projects slightly past the free edge of the horizontal rim-supporting portion of the disk D, and if other rim supporting means were resorted to the shell 17 should be of greater width if the rim is not partially protected from the heat by the rim-supporting means.

In operation of the construction disclosed, the spiral rib or fin 14 will, upon rotation of the wheel W, act as an air pump or will draw air through the holes 15 and expel it through the holes 16, or in the opposite direction upon reverse rotation of the wheel. This continuous flow of air in contact with the heat radiating rib 14 will dissipate the heat generated in the braking action to sufficient extent that the brake shoe linings l will not be injuriously affected and by the provision of the air guide shell or baffle 17 the dissipated heat will be maintained out of injurious contact with the tire T.

Furthermore, the air space between the rim R and baffle 17 provides for rapid dissipation of any heat radiated by the baffle due to a natural circulation of air through the open side of the air space and holes 16.

While I have disclosed but a single specific embodiment of my invention, nevertheless the same is to be considered as illustrative and not restrictive, the scope of the invention being defined in the sub-joined claims.

What I claim and desire to secure by U. S. Letters Patent is:—

1. A wheel construction comprising a hub, a rim supporting a cushion tire, a disk connecting the hub and the rim, a fixed circular plate in spaced relation to said disk and substantially parallel therewith, a brake drum secured to the hub and disposed between said disk and fixed plate, laterally opposed air openings in said disk and plate adjacent the outer peripheries thereof, a cylindrical air guide shell disposed between said rim and said brake drum in spaced relation to both thereof and having one edge thereof supported by the outer periphery of said plate, and a spiral rib on the outer periphery of said drum in lateral alinement with said air openings for radiating heat from the drum and effecting an air current through said openings and between said drum and air guide shell upon rotation of said wheel construction.

2. In a wheel construction, a rim supporting a cushion tire, a hub, an open wheel structure connecting the rim and hub, a fixed plate defining with said structure a brake drum housing, a brake drum secured to the hub and disposed within the housing with the periphery thereof in spaced relation to the rim, a cylindrical baffle in spaced relation to the rim and brake drum and extending from the outer periphery of the fixed plate toward the open wheel structure, air openings in the fixed plate between the cylindrical baffle and the brake drum, and a spiral rib on the outer surface of said drum for drawing atmospheric air through said openings into contact with said drum and forcing the air out through said open wheel structure upon rotation of said drum.

3. In a wheel construction, a hub, a rim supporting a cushion tire, a disk connecting the hub and the rim, a fixed circular plate in spaced relation to said disk, a brake drum secured to the hub and disposed between the disk and fixed plate, a cylindrical baffle between the rim and brake drum, the cylindrical baffle being secured to the fixed plate, said cylindrical baffle, fixed plate, and brake drum, jointly, defining an air current chamber, laterally opposed air openings in the disk and plate adjacent the outer peripheries thereof and inwardly of the baffle, and a spiral rib on the outer periphery of said drum in lateral alinement with said openings for radiating heat from the drum and effecting an air current through said openings and over said rib upon rotation of said wheel construction.

THEODORE A. PETERMAN.